Feb. 13, 1962 R. G. WEBB 3,020,998
APPARATUS FOR CLAMPING AND INDEXING ARTICLES
Filed May 19, 1958 3 Sheets-Sheet 2
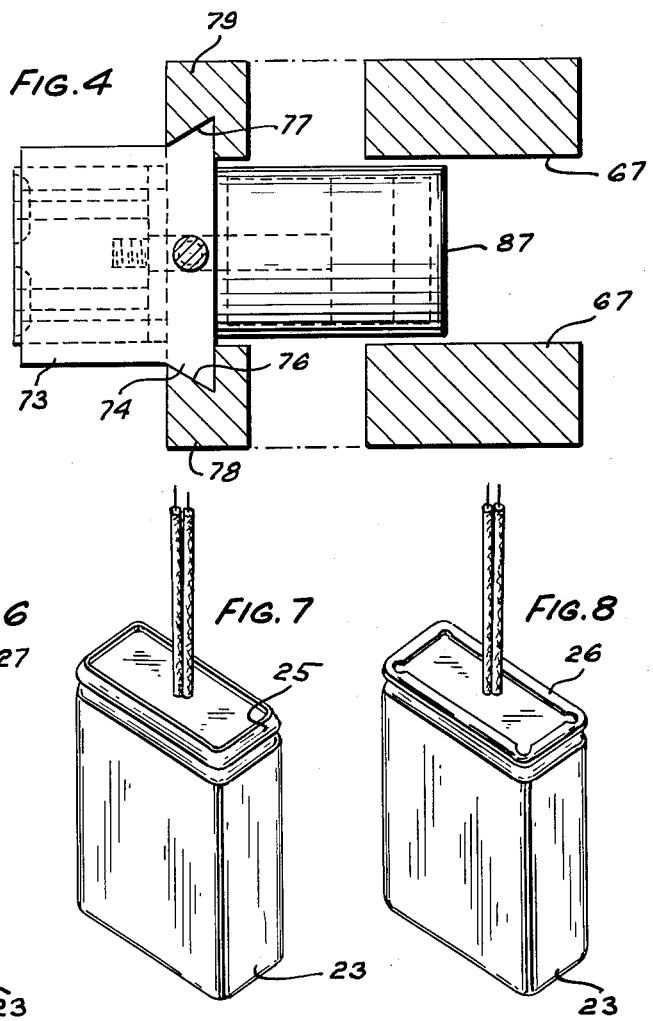
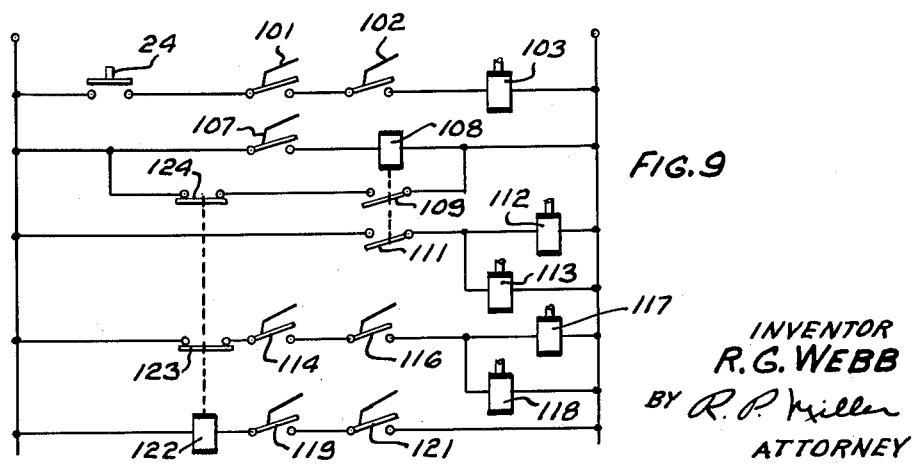
INVENTOR
R.G. WEBB
BY R. P. Miller
ATTORNEY

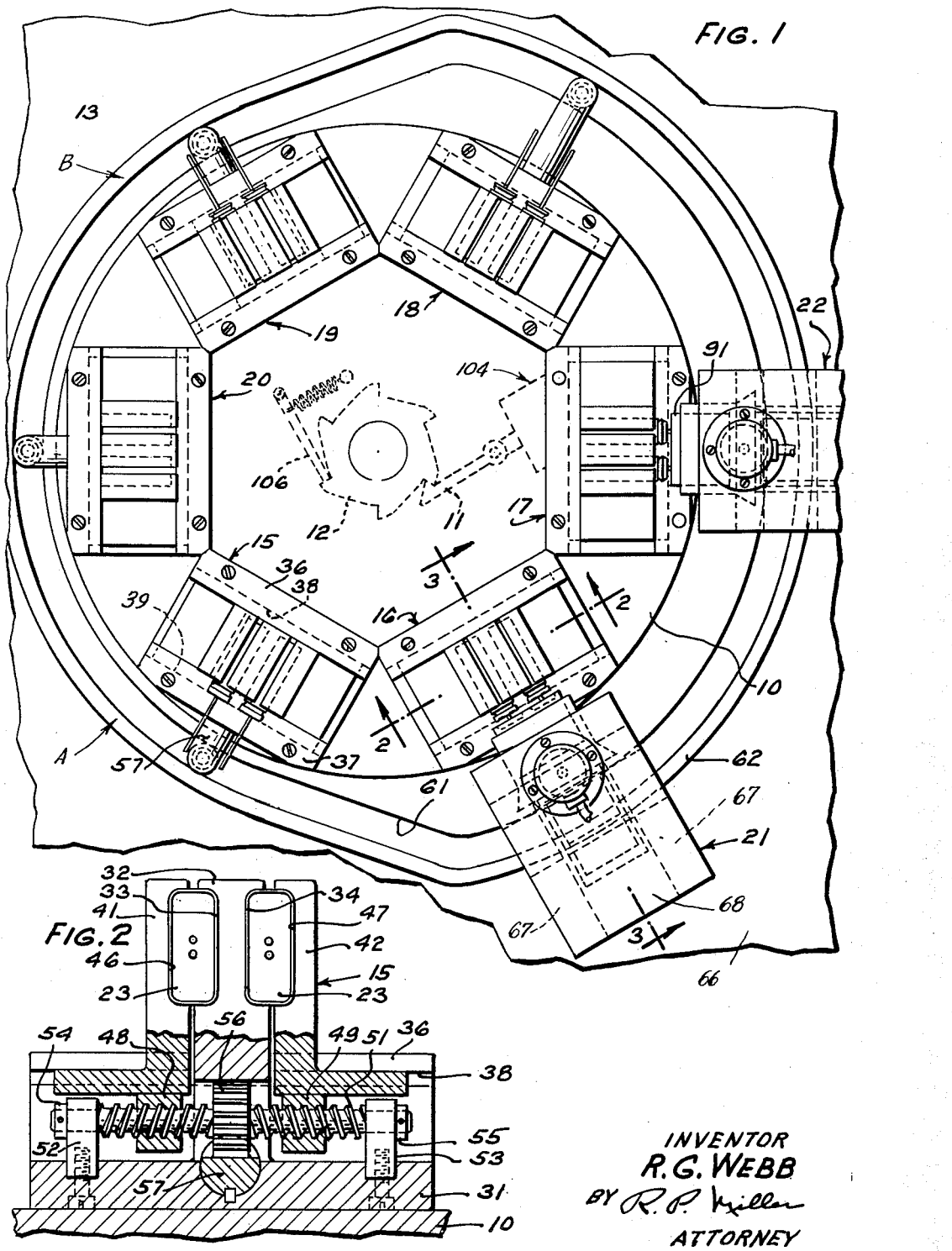

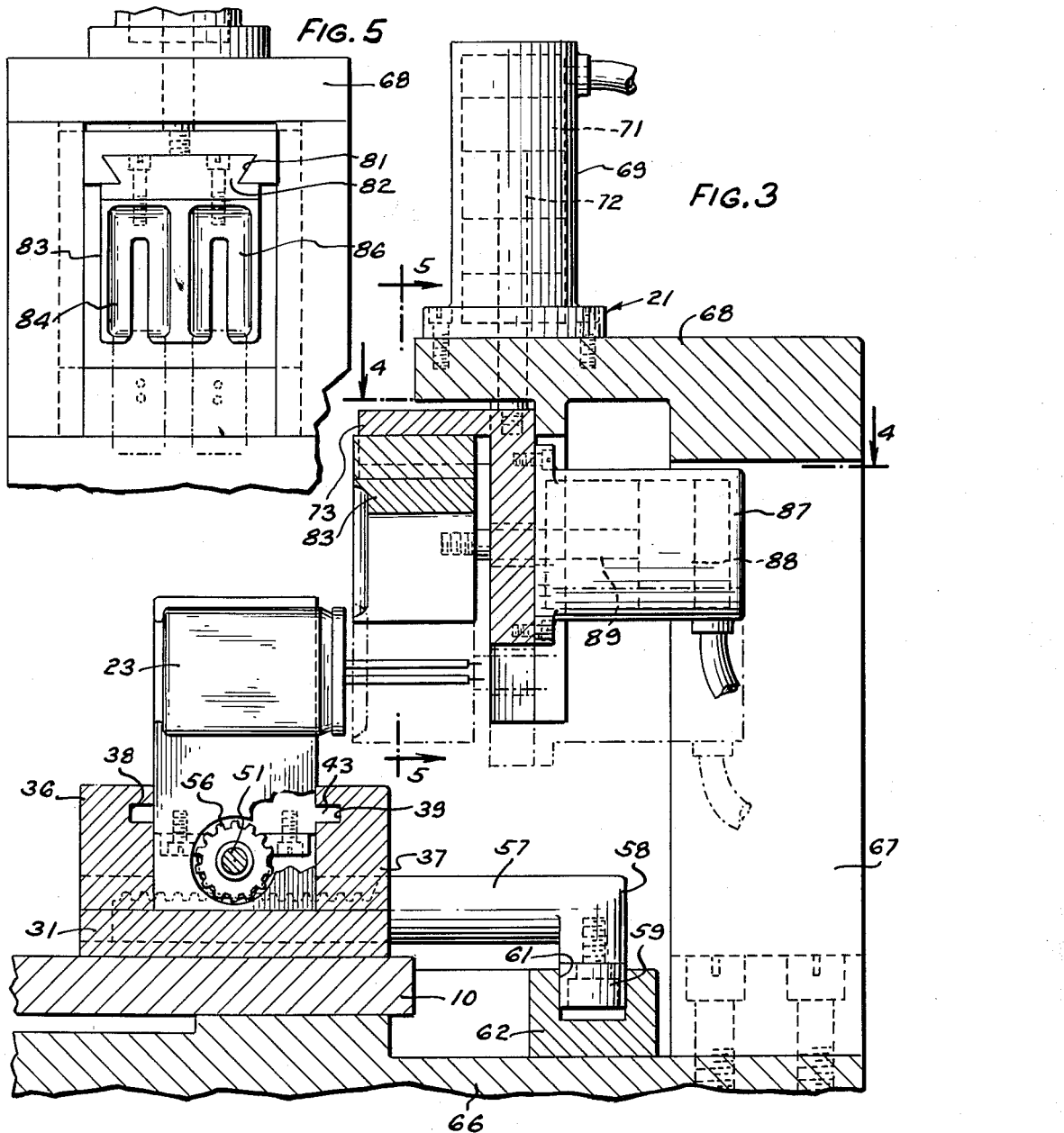

United States Patent Office 3,020,998
Patented Feb. 13, 1962

3,020,998
APPARATUS FOR CLAMPING AND INDEXING ARTICLES
Robert G. Webb, Indianapolis, Ind., assignor to Western Electric Company, Incorporated, New York, N.Y., a corporation of New York
Filed May 19, 1958, Ser. No. 736,062
3 Claims. (Cl. 198—210)

This invention relates to article clamping and indexing apparatus.

In automatic installations adapted to form or crimp cans or other containers, it is necessary that the ends of the cans be crimped in a series of steps to secure the contents within the cans. In these automatic installations employing feed devices, it is a further requisite that the gripping means positively hold the cans during the crimping operations. These gripping facilities must also be capable of being rapidly actuated to permit the insertion and withdrawal of the unformed and formed cans.

It is a prime object of this invention to provide automatic advancing means having facilities for selectively gripping and releasing cans being advanced to automatic fabricating machines.

The invention also has as an object, the provision of a series of work holders each of which has a pair of movable gripping jaws that are simultaneously moved into a gripping position through the operation of instrumentalities actuated by the advance of a carrier for the work holders.

An additional object of the invention resides in work holder gripping jaws that are operated by a worm that is controlled by the operation of a rack and pinion actuated by a grooved cam girding a turntable on which the work holders are mounted.

With these and other objects in view, the present invention contemplates a turntable that is adapted to be indexed to advance a series of work holders through a pair of crimping or other metal forming devices. As the turntable indexes, a cam follower associated with each work holder is moved to operate a rack and pinion which functions to rotate a worm to move a pair of gripping elements into position to securely retain a pair of work pieces.

Other objects and advantages of the present invention will be apparent from the following detailed description when considered in conjunction with the accompanying drawings, wherein FIG. 1 is a top plan view of a turntable having a plurality of work holders mounted thereon together, with a pair of crimping devices arranged and constructed to illustrate the principles of the present invention;

FIG. 2 is an enlarged sectional view taken along line 2—2 of FIG. 1 particularly illustrating the cross-sectional construction of one of the work holders in conjunction with the actuating mechanism therefor;

FIG. 3 is an enlarged sectional view taken along line 3—3 of FIG. 1 depicting a work holder and one of the crimping devices;

FIG. 4 is a sectional view taken along line 4—4 of FIG. 3 of a crimping tool together with a dove-tailed guideway that permits the tool to move into alignment with a work piece on the turntable;

FIG. 5 is a sectional view taken along line 5—5 of FIG. 3 illustrating the front of the crimping tool together with a dove-tailed guideway that permits the tool to move into a crimping position;

FIGS. 6, 7 and 8 disclose a capacitor can during three stages of operation of the apparatus disclosed in the other figures, and FIG. 9 is a diagram of a control circuit for automatically operating the apparatus shown in FIGS. 1–5.

Considering the general overall features of the machine, with particular reference to FIG. 1, there is shown a turntable or carrier 10 adapted to be indexed by the cyclic operation of a pawl 11 and a ratchet 12 to advance a plurality of work holders 15–20 through a pair of crimping or metal forming or bending devices generally depicted by the reference numerals 21 and 22. In operation of the apparatus, an attendant located at a station indicated by the letter A loads uncrimped capacitor cans 23 into each work holder and then operates a start button 24 (FIG. 9) to initiate the apparatus into operation, whereupon the work holder will advance the can to the crimping device 21 whereat the crimping device automatically functions to advance crimping tools into engagement with the cans to crimp the ends thereof to provide beveled surfaces 25 as indicated in FIG. 7. Upon subsequent operation of the push button 24, the cans are advanced to the crimping device 22 that automatically functions to complete the crimping operation by further bending the beveled surfaces 25 into flat surfaces 26 as indicated in FIG. 8. Each can 23 has mounted therein a capacitor network 27 from which extends a pair of leads 28 and 29.

Attention is particularly directed to FIGS. 1, 2 and 3 where the construction of a typical work holder 15 may be understood. The work holder 15 consists of a base 31 having secured thereto an upwardly extending standard 32 that is recessed to provide a pair of grooves 33 and 34 to accommodate a pair of cans 23. There is also mounted on the base 31 a pair of spaced guide plates 36 and 37 having longitudinally extending guideways 38 and 39 formed therein. These guide plates are secured along chords of the circular turntable. A pair of slide jaws 41 and 42 are positioned between the plates 36 and 37 and each has a pair of laterally extending tenons 43 that extend into the guideways 38 and 39. Jaws 41 and 42 are also recessed to provide grooves 46 and 47 to accommodate the positioned capacitor cans 23. Depending from the bottom surfaces of the slide jaws 41 and 42 are a pair of blocks 48 and 49 that are threaded to accommodate opposite hand threads of a worm 51. The extremities of the worm 51 are rotatably mounted in a pair of bearing blocks 52 and 53 secured to the base 31. The worm 51 is retained between the bearing blocks 52 and 53 by means of a pair of collars 54 and 55 secured to the ends of the worm.

Mounted on an unthreaded portion of the center of the worm 51 is a pinion gear 56 adapted to cooperate with the teeth of a rack 57. Referring particularly to FIGS. 1 and 3, the end of the rack has an arm 58 extending downwardly therefrom to which is secured a rotatable cam follower 59. This cam follower is adapted to ride within a cam groove 61 formed in a cam track 62 that girds the turntable 10.

When the table 10 is indexed to advance the work holder 15, the cam follower 59 will be moved by the action of the cam groove 61 to move the rack 57 toward the right as viewed in FIG. 3 thereby rotating the pinion 56 and the worm wheel 51. The opposite hand threads on the worm 51 react on the threaded blocks 48 and 49 to move said blocks toward each other thereby moving the slide jaws 41 and 42 toward the center standard 32 to grip a pair of cans 23. As the work holder 15 is advanced from the crimping device 22 toward an unloading station depicted by the reference letter B, the cam follower 59 is moved inwardly toward the center of the turntable to again operate the rack, pinion and worm to cause the jaws 41 and 42 to move outwardly from the center standard 32 thereby releasing the cans 23 and thus permitting the attendant to remove the crimped cans.

The construction of one of the crimping devices 22 will now be explained with particular reference to FIGS. 1, 3, 4 and 5. A base 66 for the overall apparatus provides a support for a pair of spaced upwardly extending standards 67 having a laterally extending bracket 68 that has mounted thereon an air cylinder 69. Air cylinder 69 is adapted to control the position of a piston 71 and a piston rod 72 attached to an L-shaped frame 73. Looking at FIG. 4, it will be noted that the upright section of the L-shaped frame is flared to provide a dove tail 74 that rides within dove-tailed grooves 76 and 77 formed in a pair of depending members 78 and 79 attached to the bracket 68. The laterally extending section of the L-shaped frame 73 is formed to provide a dove-tailed section 82 (see FIG. 5) of a forming die holder 83. The forming die holder 83 has mounted therein a pair of U-shaped beveled surface dies 84 and 86. There is also mounted on the downwardly extending section of the L-shaped frame 73 a second air cylinder 87 having a piston 88 that operates a piston rod 89 attached to the rear section of the die holder 83.

In operation of the crimping device 21 air is first admitted to cylinder 69 causing piston 71 and piston rod 72 to move downwardly thereby advancing the L-shaped frame 73 into the dotted line position shown in FIG. 3. In this position the dies 84 and 86 will span the wires 28 and 29 extending from the pair of cans 23. The dies 84 and 86 will now be positioned in lateral alignment with the uncrimped ends of the cans 23. Facilities are then rendered effective to admit air to the cylinder 87 whereupon the piston 88 and the piston rod 89 move toward the left to move the die holder 83 and the dies 84 and 86 into engagement with the cans 23 whereupon said cans are crimped to provide the beveled surface 25 as illustrated in FIG. 7.

It will be understood that the other work holders 16, 17, 18, 19 and 20 are identical in construction with the fully described work holder 15. Further, it will be understood that the crimping device 22 is substantially the same as the previously described crimping device 21. The only difference between the two crimping devices resides in the shape of the crimping dies. In crimping device 22, the die is substantially straight-faced and is denoted in FIG. 1 by the reference numeral 91. It will be noted from a reference to FIG. 3 that in the initial position, the crimping dies are positioned above the cans 23 so that the wires 28 and 29 extending from the can will not engage the dies during the indexing of the turntable 10.

Recapitulating on the operation of the overall apparatus, particular reference is made to FIG. 9 wherein there is shown a control circuit having a number of switches that may be positioned in accordance with the particular requirements of a user to provide the necessary functioning of the apparatus. In the initial position, a pair of switches 101 and 102 are closed by having the L-shaped frames 73 in the upper or unoperated position. The attendant located at Station A will then insert a pair of cans 23 into the work holder 15 whereafter he will depress the start button 24. Closure of button 24 results in the energization of a solenoid 103 that controls the admission of air to a cylinder 104 having positioned therein a piston for operating the pawl 11 to advance the ratchet 12. In order to hold the ratchet 12 in the advanced position and against retrograde movement, a spring-biased detent 106 is provided to engage and ride over the advancing teeth of the ratchet 12. As the pawl 11 is advanced, the turntable 10 moves the work holder 15 so that the cam follower 59 riding in the groove 61 actuates the jaws 41 and 42 to securely grip the pair of cans 23. When the pawl 11 completes its movement, a switch 107 is closed to energize a relay 108 that draws up a contact 109 to complete a locking circuit. Energization of the relay 108 also effectuates the closure of a contact 111 that energizes a pair of solenoids 112 and 113 that are respectively connected to control the application of air to the cylinders 69 associated with the crimping devices 21 and 22. As the crimping devices move the crimping tools downwardly, a pair of switches 114 and 116 are closed to simultaneously energize a pair of solenoids 117 and 118. These solenoids operate valves to admit air to the cylinders 87 that function to control the movement of the crimping tools into engagement with the positioned cans. When the crimping tools have completed the crimping operation, a pair of switches 119 and 121 are closed to energize a relay 122. Relay 122 thereupon opens a contact 123 to interrupt the energizing circuit for the solenoids 117 and 118; thus, permitting the crimping tools to move from engagement with the cans. Relay 122 also opens a contact 124 to interrupt the locking circuit for the relay 108 whereupon the contacts 111 are opened to deenergize the solenoids 112 and 113. Deenergization of these solenoids results in a restoration of the crimping devices to the initial or upper rest positions and closes the contacts 101 and 102 to again condition the control circuit for another cycle of operation upon subsequent depression of the push button 24.

It is to be understood that the above-described arrangements of apparatus and construction of elemental parts are simply illustrative of an application of the principles of the invention and many other modifications may be made without departing from the invention.

What is claimed is:

1. In an apparatus for clamping and indexing articles, a turntable, a pair of guides mounted on and along spaced chords of the turntable, a first clamp movably mounted in the guides, a second clamp against which the first clamp may coact, a threaded block attached to the first clamp, a worm rotatably mounted on the turntable and in threaded engagement with the threaded block, a gear mounted on the worm, a rack cooperating with the gear, a cam follower mounted on the rack, a cam track mounted about the turntable and engaging the cam follower, and means for indexing the turntable whereby the cam follower moves the rack to rotate the gear and worm so that the block is advanced along the worm to move the first clamp in the guides.

2. In a clamping and indexing apparatus including a turntable and means for indexing the turntable, said turntable having thereon a pair of threaded article clamping segments which are adapted for relative motion to closed and opened positions, the improvement which comprises in combination means mounted on said turntable for guiding said clamping segments during motion of said segments, threaded means mounted on said turntable for causing said relative motion of said clamping segments, a gear secured to and rotatable with said threaded means, a rack cooperating with said gear, a cam follower operatively associated with said rack and a stationary camming means adjacent to said turntable and engaging said cam follower so that when said turntable is indexed said camming means shifts said cam follower which moves said rack and rotates said gear and said threaded means to cause said relative motion of said clamping segments.

3. In a clamping and indexing apparatus including a turntable, a stationary cam track adjacent to said turntable, means for indexing said turntable, a pair of threaded article clamping segments and a worm movably mounted on said turntable said worm being adapted to cause relative motion of said clamping segments to closed and opened positions, the combination which comprises, a gear secured to and rotatable with said worm, a rack meshed with said gear and a cam follower secured to said rack and engaging said cam track, whereby as said turntable is being indexed said cam follower moves said rack and rotates both said gear and said worm to impart said relative motion to said clamping segments.

References Cited in the file of this patent

UNITED STATES PATENTS

| | | |
|---|---|---|
| 1,105,661 | Hookey | Aug. 4, 1914 |
| 2,337,528 | Stuckert et al. | Dec. 21, 1943 |
| 2,349,638 | Schreiber | May 23, 1944 |
| 2,559,904 | Swanson | July 10, 1951 |
| 2,564,138 | Walker | Aug. 14, 1951 |
| 2,585,828 | Pearson | Feb. 12, 1952 |
| 2,701,482 | Otto | Feb. 8, 1955 |